United States Patent Office 3,098,713
Patented July 23, 1963

3,098,713
STABILIZATION OF SULFUR TRIOXIDE AND
HIGH STRENGTH OLEUMS
James R. Jones, Tonawanda, and Russell F. Fogle, Jr.,
Niagara Falls, N.Y., assignors to Olin Mathieson Chemical Corporation, a corporation of Virginia
No Drawing. Filed Mar. 21, 1958, Ser. No. 722,828
16 Claims. (Cl. 23—174)

This invention relates to the stabilization of sulfur trioxide and high strength oleums.

Three sulfur trioxide polymers are known to form in sulfur trioxide and in high strength oleums. They are commonly denoted as alpha, beta and gamma. The melting points of these polymers are, respectively, 62° C., 33° C., and 17° C. It is advantageous to stabilize and thereby inhibit polymerization of sulfur trioxide to the alpha and beta forms as liquefaction of these polymers is not easily accomplished, and liquefaction of the alpha polymer is hazardous due to the sudden increase in vapor pressure which occurs at the melting temperature. Heretofore, nitrosyl compounds, boron compounds and carbon tetrachloride have been used to stabilize sulfur trioxide and high strength oleums.

The present invention provides the art with another means whereby stabilized sulfur trioxide and high strength oleum compositions can be prepared. Thus, we have discovered that sulfur trioxide and oleum of at least about 80% strength can be stabilized by incorporating therein not more than 2% by weight and preferably 0.1% to 1% by weight of certain aromatic compounds. As little as about 0.01% by weight is satisfactory in some circumstances. Accordingly, the present invention provides a method of stabilizing sulfur trioxide and high strength oleum, and also provides a stabilized sulfur trioxide and a stabilized high strength oleum composition. The method of the invention comprises adding to sulfur trioxide or oleum of at least about 80% strength not more than 2% by weight of the aromatic compound. It is not known whether the aromatic compound is present as such in the compositions of the invention or whether it is present therein as a reaction product or products of the aromatic compound and sulfur trioxide. Hence, the composition of the invention can best be defined as sulfur trioxide or oleum of at least about 80% strength which has been stabilized by the addition thereto of not more than 2% by weight of the aromatic compound.

Many non-aromatic and many aromatic organic compounds were tested as sulfur trioxide stabilizers. The non-aromatic organic compounds were found to be either useless or effective only to prevent the formation of the alpha polymer. In those cases in which non-aromatic organic compounds did inhibit polymerization, the effect was temporary as only a trace of moisture would bring about complete polymerization to the alpha form. The aromatic compounds defined below, on the other hand, all inhibited the formation of the alpha polymer, and about 80% of the aromatic compounds tested inhibited the formation of the beta polymer. Moreover, sulfur trioxide or high strength oleum stabilized with the aromatic compounds was found to be substantially more resistant to the action of moisture than was the sulfur trioxide stabilized with non-aromatic compounds. Further, when kept in moisture proof containers, sulfur trioxide or high strength oleum treated according to the invention with aromatic compounds which inhibit the formation of the alpha and beta polymers can be stored at normal atmospheric temperatures without either of these polymers being formed. The compositions of the invention, however, will polymerize upon prolonged exposure to atmospheric moisture so that this should be avoided.

The aromatic compounds useful in this invention are the aromatic hydrocarbons and halogen substituted aromatic hydrocarbons. More particularly, they are benzene, diphenyl and fused ring aromatic hydrocarbons of 10 to 14 ring carbon atoms and the halogen, alkyl and haloalkyl substituted derivatives of benzene, diphenyl and such fused ring aromatic hydrocarbons. The fused ring aromatic hydrocarbons include, for example, naphthalene, fluorene, anthracene, phenanthrene and tetrahydronaphthalene.

The halobenzenes include, for example, chlorobenzene, bromobenzene, 1,3-dichlorobenzene, 1,2,4-trichlorobenzene, 1,2,4,5-tetrachlorobenzene and pentachlorobenzene. The haloalkylbenzenes include, for example, bis(trifluoromethyl)benzene and the chlorotoluenes. The alkylbenzenes include, for example, toluene, the xylenes, ethyl benzene and cumene. The halodiphenyls include, for example, o-chlorodiphenyl and p-chlorodiphenyl. The halogen, alkyl and haloalkyl substituted fused ring aromatic hydrocarbons include, for example, halonaphthalenes, e.g., 1-chloronaphthalene, 2-chloronaphthalene and tetrachloronaphthalene, and alkylnaphthalenes, e.g. α-methyl naphthalene and β-methyl naphthalene. Preferably, in the above compounds the alkyl group contains from 1 to 4 carbon atoms and the halogens are chlorine, bromine and fluorine.

The aromatics can be represented by the following formula $$Ar—X_n$$

wherein Ar is an aryl hydrocarbon nucleus of 6 to 14 ring carbon atoms, e.g. phenyl, diphenyl and fused ring aromatics of 10 to 14 ring carbon atoms, e.g. naphthyl, tetrahydronaphthyl, fluorenyl, anthryl and phenanthryl; and X is hydrogen, halogen, alkyl or haloalkyl; and $n$ is 1 to 14 depending on the number of ring carbon atoms in the Ar nucleus, i.e. 1 to 6 when Ar has 6 ring carbon atoms or greater when Ar has more than 6 carbon atoms, i.e. is a polynuclear aryl hydrocarbon. When $n$ is more than 1, the X substituent can be the same or different.

In the practice of the invention, the aromatic compound used can be added to liquid sulfur trioxide or high strength oleum. A small amount of sludge or oily liquid as a second phase frequently forms in the resulting solution (i.e. treated sulfur trioxide or high strength oleum) and depending on the aromatic compound used, color may be imparted to the solution. If desired, the sludge or oily liquid can be removed by any suitable means. Thus, sludge may be removed by filtration or oily liquid may be separated from the solution by decantation. However, whether the sludge or oily liquid is removed or not, the treated sulfur trioxide or high strength oleum is effectively stabilized.

Completely aromatic hydrocarbons (i.e. benzene or compounds made up entirely of hydrogen deficient benzene rings joined by carbon to carbon bonds), particularly those having the most sterically unhindered aromatic nucleus and more particularly diphenyl and benzene, are preferred for use in practicing the invention as they produce less sludge and no color and are the most effective stabilizers. In general, the less completely aromatic the stabilizing agent and the larger the non-aromatic groups thereof, the greater is the amount of sludge formation and the lower is the degree of stabilization. Complete substitution for the hydrogen of the aromatic nucleus of nuclei is preferably avoided.

The method of this invention also includes adding one of the defined aromatic compounds to the sulfur trioxide and oleum, separating sulfur trioxide from the resulting mixture and adding some of the resulting residue to the material to be stabilized, the total amount of aromatic compound added being not more than 2% by weight based on the weight of the finally stabilized composition.

The following examples describe specific embodiments of the invention.

*Example 1*

74 grams of liquid sulfur trioxide was transferred to a testing vial containing 0.1 gram of diphenyl. This amount of diphenyl is 0.14% by weight of the sulfur trioxide. Twenty-five milliliters of this sample was then transferred (in a dry-box containing an anhydrous nitrogen atmosphere) to a second testing vial. The vial was then sealed and placed in contact with Dry Ice until the contents were completely frozen. It was then placed in a water bath maintained at a temperature of 15° to 17° C., whereupon the sulfur trioxide melted completely within 15 minutes.

Another 25 milliliter sample of liquid sulfur trioxide was withdrawn from the stabilized composition of this example. It was transferred 15 times in the laboratory atmosphere (27% relative humidity), the final transfer being to a testing vial wherein it was sealed. The vial was then placed in contact with Dry Ice. After solidification of the sulfur trioxide, the vial was placed in a 15° to 17° C., water bath whereupon the entire sample remelted quickly.

*Example 2*

58 grams of liquid sulfur trioxide was transferred to a testing vial containing 0.1 gram of diphenyl. This amount of diphenyl is 0.17% by weight of the sulfur trioxide. The mixture was sealed in a testing vial, frozen in contact with Dry Ice, and remelted in a 17° C., water bath. The sample was then refrozen in a Dry Ice-acetone bath and maintained at that temperature (−78° C.), for 94 hours. After this treatment, 90 percent of the solid remelted at 15° to 17° C., while only 10 percent had polymerized to higher melting forms. In a similar manner o- or p-chlorodiphenyl can be used to stabilize the sulfur trioxide.

*Example 3*

An aromatic compound-sulfur trioxide mixture was made by placing 0.3 gram of diphenyl in a testing receiver and adding thereto about 70 grams of liquid sulfur trioxide. About 69 grams of sulfur trioxide was then removed from the resulting mixture by distillation under a reduced pressure of about 10 mm. of Hg. The resulting solid residue, which contained the reaction product or products, if any, of sulfur trioxide and diphenyl, was treated with 70 grams of fresh, unstabilized sulfur trioxide, and this second batch was then distilled under a reduced pressure of about 10 mm. of Hg and about 69 grams of sulfur trioxide was thereby removed. To the resulting solid residue from this distallation, there was added 68.7 grams of fresh, unstabilized sulfur trioxide. This mixture was sealed in a testing vial, frozen with Dry Ice, and completely remelted in a 15° to 17° C., water bath.

*Example 4*

235 grams of liquid sulfur trioxide was transferred to to a testing vial containing 0.8 gram of diphenyl. This amount of diphenyl is 0.34% by weight of the sulfur triozide. The resulting mixture was placed in a flask equipped with a side-arm which housed a stopcock. The end of the side-arm was fitted with a rubber diaphragm. The flask was immersed in a 17° C., water bath and concentrated sulfuric acid was injected, by means of a hypodermic needle, through the rubber diaphragm and the opened stopcock, whereupon the sulfuric acid dripped into the sulfur trioxide. The sulfuric acid was injected in small increments and after each addition of the latter the sample was placed in a Dry Ice-acetone bath (−78° C.) until is solidified. In each instance it was found that the sample remelted completely at 17° C., until a total of 0.038 gram of $H_2O$ (in the form of the concentrated $H_2SO_4$) had been introduced. At this time a small amount of solid remained after remelting. The above treatment was continued with progressively more solid remaining unmelted at 17° C., until after a total of 0.41 gram of $H_2O$ (added as concentrated $H_2SO_4$) had been introduced. At this time none of the sample remelted at 17° C., however, 80 percent of the sample did remelt at 30° to 32° C.

This example shows that the high strength oleum resulting from the addition of concentrated $H_2SO_4$ to the sulfur trioxide was stabilized, and demonstrates the high resistance of sulfur trioxide stabilized according to the invention to the action of moisture.

*Example 5*

254 grams of sulfur trioxide was added to a testing vial containing 0.3 gram of diphenyl. To this mixture there was added sufficient 96% $H_2SO_4$ to form a solution which was 83% oleum. A sample of this oleum was then frozen by means of a Dry Ice-acetone mixture (−78° C.,). The flask containing the resulting solid was then placed in a water bath and subjected to progressively higher temperatures thereby. The following chart shows the percent of the solid which had melted at the given temperatures.

| Temperature: | Percent original solid melting |
|---|---|
| 15–17° | 40–50 |
| 24° | 80 |
| 30–32° | 93 |
| 40° | 99+ |

*Example 6*

Three-tenths of a gram of naphthalene was placed in a glass tube and sulfur trioxide was distilled into the tube until 58.7 grams had collected. The liquid sulfur trioxide containing dissolved naphthalene was frozen in Dry Ice and then placed in a water bath at about 15 to 17° C. The sample melted completely at this temperature showing that it was stabilized against polymerization. In a similar manner α- or β-methyl naphthalene or 1-chloronaphthalene can be used to stabilize the sulfur trioxide.

*Example 7*

Three-tenths of a gram of benzene was placed in a glass receiver and 56.7 grams of liquid sulfur trioxide was condensed into the tube to yield a composition containing 0.525 percent of benzene. The sample was frozen in Dry Ice and then immersed in a water bath at 15 to 17° C. The composition melted completely showing that no polymer was formed.

*Example 8*

Four-tenths of a gram of chlorobenzene was placed in a receiving tube and 26.8 grams of liquid sulfur trioxide was introduced to form a mixture containing 1.45 percent of chlorobenzene. The composition was frozen in Dry Ice and placed in a water bath at 15 to 17° C. It melted completely showing that the sulfur trioxide was thus stabilized.

*Example 9*

Sulfur trioxide was liquefied in a glass tube containing chlorobenzene until the composition contained 0.5 percent of chlorobenzene. The solution was frozen in Dry Ice and then placed in a water bath at 15 to 17° C. The entire sample melted showing complete stabilization.

*Example 10*

Three-tenths of a gram of bis(trifluoromethyl)benzene was placed in a glass tube and 57.2 grams of liquid sulfur trioxide was added to yield a composition containing 0.522 percent of bis(trifluoromethyl)benzene. The sample was frozen in Dry Ice and then placed in a water bath at 15–17° C. The sulfur trioxide was completely stabilized since the sample melted without any residual solid at this temperature.

*Examples 11–13*

The following compounds were found to prevent the formation of the alpha and beta polymers both in the original mixtures obtained by the addition of the compounds to liquid sulfur trioxide and in the filtrate obtained after standing and removal by filtration of any solid reaction product.

| Example | Stabilizer | Percent by Weight Originally Added |
| --- | --- | --- |
| 11 | Chlorobenzene | 1.45 |
| 12 | Diphenyl | 0.088 |
| 13 | Benzene | 0.805 |

In each of these examples, stabilization of the original mixture and of the filtrate was such that following freezing of samples of the original mixture and of the filtrate by contacting vessels containing the samples with Dry Ice and then placing the vessels in a water bath maintained at 15 to 17° C., the sulfur trioxide of each sample melted completely.

*Example 14*

Three-tenths of a gram of toluene is placed in a glass receiver and 56.7 grams of liquid sulfur trioxide is condensed into the tube to yield a composition containing 0.525 percent of toluene. The sample is frozen in Dry Ice and then immersed in a water bath at 15 to 17° C. The composition melts completely showing that no polymer is formed.

The sulfur trioxide used in the foregoing examples was substantially pure sulfur trioxide such as may be obtained by distillation of say 30% oleum, or by compression and condensation of sulfur trioxide from a mist free sulfur dioxide-sulfur trioxide gas mixture obtained from a sulfur dioxide converter.

The sulfur trioxide composition of the invention can be used in a wide variety of organic sulfonations and sulfations. For example, sulfur trioxide stabilized with diphenyl according to the invention can be used to sulfate stearyl alcohol.

This application is a continuation-in-part of pending application Serial No. 561,364, filed January 25, 1956.

What is claimed is:

1. The method of stabilizing material selected from the group consisting of sulfur trioxide and oleum of at least about 80% strength which comprises adding thereto in an amount at least effective to stabilize the sulfur trioxide and oleum but not more than 2% by weight of an aromatic compound selected from the group consisting of benzene, alkylbenzene in which the alkyl group contains from 1 to 4 carbon atoms, haloalkylbenzene in which the alkyl group contains 1 to 4 carbon atoms, chlorobenzene, diphenyl, chlorodiphenyl, naphthalene, chloronaphthalene and alkylnaphthalene in which the alkyl group contains from 1 to 4 carbon atoms.

2. The method of claim 1 wherein said compound is added to liquid sulfur trioxide.

3. The method of stabilizing liquid sulfur trioxide which comprises adding thereto 0.1% to 1% by weight of benzene.

4. The method of stabilizing liquid sulfur trioxide which comprises adding thereto 0.1% to 1% by weight of diphenyl.

5. The method of stabilizing liquid sulfur trioxide which comprises adding thereto 0.1% to 1% by weight of chlorobenzene.

6. The method of stabilizing liquid sulfur trioxide which comprises adding thereto 0.1% to 1% by weight of bis(trichloromethyl)benzene.

7. The method of stabilizing liquid sulfur trioxide which comprises adding thereto 0.1% to 1% by weight of naphthalene.

8. The method of stabilizing material selected from the group consisting of liquid sulfur trioxide and oleum of at least about 80% strength which comprises adding an aromatic compound thereto, separating sulfur trioxide from the resulting mixture and adding some of the residue remaining after the sulfur trioxide is separated to the material to be stabilized, the total amount of said aromatic compound added being in at least an amount effective to stabilize the sulfur trioxide and oleum but not more than 2% by weight based upon the weight of the finally stabilized composition, said aromatic compound being selected from the group consisting of benzene, alkylbenzene in which the alkyl group contains from 1 to 4 carbon atoms, haloalkylbenzene in which the alkyl group contains 1 to 4 carbon atoms, chlorobenzene, diphenyl, chlorodiphenyl, naphthalene, chloronaphthalene and alkylnaphthalene in which the alkyl group contains from 1 to 4 carbon atoms.

9. A stabilized composition consisting essentially of material selected from the group consisting of liquid sulfur trioxide and oleum of at least about 80% strength, said material having been stabilized by the addition thereto in at least an amount effective to stabilize the sulfur trioxide and oleum but not more than 2% by weight of an aromatic compound selected from the group consisting of benzene, alkylbenzene in which the alkyl group contains from 1 to 4 carbon atoms, haloalkylbenzene in which the alkyl group contains 1 to 4 carbon atoms, chlorobenzene, diphenyl, chlorodiphenyl, naphthalene, chloronaphthalene and alkylnaphthalene in which the alkyl group contains from 1 to 4 carbon atoms.

10. A stabilized liquid sulfur trioxide composition consisting essentially of liquid sulfur trioxide stabilized by the addition thereto of 0.1% to 1% of benzene.

11. A stabilized liquid sulfur trioxide composition consisting essentially of liquid sulfur trioxide stabilized by the addition thereto of 0.1% to 1% of diphenyl.

12. A stabilized liquid sulfur trioxide composition consisting essentially of liquid sulfur trioxide stabilized by the addition thereto of 0.1% to 1% of chlorobenzene.

13. A stabilized liquid sulfur trioxide composition consisting essentially of liquid sulfur trioxide stabilized by the addition thereto of 0.1% to 1% of bis(trifluoromethyl)benzene.

14. A stabilized liquid sulfur trioxide composition consisting essentially of liquid sulfur trioxide stabilzed by the addition thereto of 0.1% to 1% of naphthalene.

15. A composition of matter comprising liquid sulfur trioxide having had added thereto a minor amount but not more than 2 weight percent of a compound selected from the class consisting of benzene, alkylbenzene in which the alkyl group contains from 1 to 4 carbon atoms, haloalkylbenzene in which the alkyl group contains 1 to 4 carbon atoms, chlorobenzene, diphenyl, naphthalene and alkylnaphthalene in which the alkyl group contains from 1 to 4 carbon atoms.

16. The composition of matter comprising liquid sulfur trioxide having had added thereto 0.1 to 2 weight percent of a compound selected from the class consisting of benzene, alkylbenzene in which the alkyl group contains 1 to 4 carbon atoms, chlorobenzene, diphenyl, naphthalene and alkylnaphthalene in which the alkyl group contains from 1 to 4 carbon atoms.

References Cited in the file of this patent

UNITED STATES PATENTS

| | | |
| --- | --- | --- |
| 1,942,386 | Stoesser et al. | Jan. 2, 1934 |
| 2,240,935 | Lepin | May 6, 1941 |
| 2,807,641 | Milner et al. | Sept. 24, 1957 |
| 2,856,437 | Cake | Oct. 14, 1958 |
| 2,868,624 | Shaver et al. | Jan 13, 1959 |

UNITED STATES PATENT OFFICE
CERTIFICATE OF CORRECTION

Patent No. 3,098,713                July 23, 1963

James R. Jones et al.

It is hereby certified that error appears in the above numbered patent requiring correction and that the said Letters Patent should read as corrected below.

Column 3, line 53, for "distallation" read -- distillation --; line 63, for "triozide" read -- trioxide --; line 73, for "is" read -- it --; column 5, line 51, after "of" insert -- liquid --.

Signed and sealed this 26th day of May 1964.

(SEAL)
Attest:

ERNEST W. SWIDER
Attesting Officer

EDWARD J. BRENNER
Commissioner of Patents